(12) United States Patent
Furuya et al.

(10) Patent No.: US 7,686,030 B2
(45) Date of Patent: Mar. 30, 2010

(54) CUT VALVE

(75) Inventors: Masashi Furuya, Kanagawa (JP); Shinichi Matsuo, Kanagawa (JP)

(73) Assignee: Piolax, Inc., Yokohama-shi, Kanagawa-ken (JP)

( * ) Notice: Subject to any disclaimer, the term of this patent is extended or adjusted under 35 U.S.C. 154(b) by 217 days.

(21) Appl. No.: 11/188,109

(22) Filed: Jul. 25, 2005

(65) Prior Publication Data

US 2006/0162776 A1 Jul. 27, 2006

(30) Foreign Application Priority Data

Aug. 31, 2004 (JP) .......................... P.2004-251723

(51) Int. Cl.
*F16K 24/04* (2006.01)

(52) U.S. Cl. ........................................ 137/202; 137/43

(58) Field of Classification Search .................. 137/43, 137/202, 15.26, 587, 433; 123/516; 141/198, 141/302; 29/890.124; 251/333
See application file for complete search history.

(56) References Cited

U.S. PATENT DOCUMENTS

| 4,095,609 | A | * | 6/1978 | Martin | 137/43 |
|---|---|---|---|---|---|
| 5,004,002 | A | * | 4/1991 | Kobayashi | 137/43 |
| 5,156,178 | A | * | 10/1992 | Harris | 137/43 |
| 5,529,086 | A | * | 6/1996 | Kasugai et al. | 137/43 |
| 5,566,705 | A | * | 10/1996 | Harris | 137/43 |
| 5,573,030 | A | * | 11/1996 | Ohsaki et al. | 137/43 |
| 5,687,778 | A | * | 11/1997 | Harris | 137/43 |
| 5,960,819 | A | * | 10/1999 | Weissinger et al. | 137/43 |
| 5,975,116 | A | * | 11/1999 | Rosas et al. | 137/202 |
| 6,286,539 | B1 | * | 9/2001 | Nishi et al. | 137/43 |
| 6,764,062 | B1 | * | 7/2004 | Daly | 123/337 |
| 6,789,783 | B2 | * | 9/2004 | Boecking | 251/333 |
| 2001/0032670 | A1 | * | 10/2001 | Brock et al. | 137/202 |
| 2004/0081787 | A1 | | 4/2004 | Nomura et al. | |
| 2004/0261846 | A1 | * | 12/2004 | Matsuo et al. | 137/202 |

FOREIGN PATENT DOCUMENTS

| JP | 2972385 | | 8/1999 |
|---|---|---|---|
| JP | 2002-195120 | | 7/2002 |
| JP | 2004-308838 | * | 4/2003 |
| JP | 2004-137909 | | 5/2004 |

OTHER PUBLICATIONS

Japanese Office Action dated Jun. 3, 2008, with English translation.

* cited by examiner

*Primary Examiner*—John Rivell
*Assistant Examiner*—Craig Price
(74) *Attorney, Agent, or Firm*—McGinn IP Law Group PLLC

(57) ABSTRACT

A cut valve which is installed on a fuel tank and is adapted to shut off a vent passage between the interior of the fuel tank and the outside when a fuel level in the fuel tank has risen, including: a housing having: a cover having a lead-out pipe connected to an external pipe; a tubular body having a vent hole communicating with the lead-out pipe; and a bottom portion closing a lower surface of the tubular body; and a float valve which is adapted to open or close the vent hole by coming into contact with and moving away from a valve seat provided at a peripheral edge of the vent hole in the ceiling portion, wherein an inner periphery of the valve seat has a tapered shape in which its diameter is gradually enlarged in a direction toward the float valve.

20 Claims, 9 Drawing Sheets

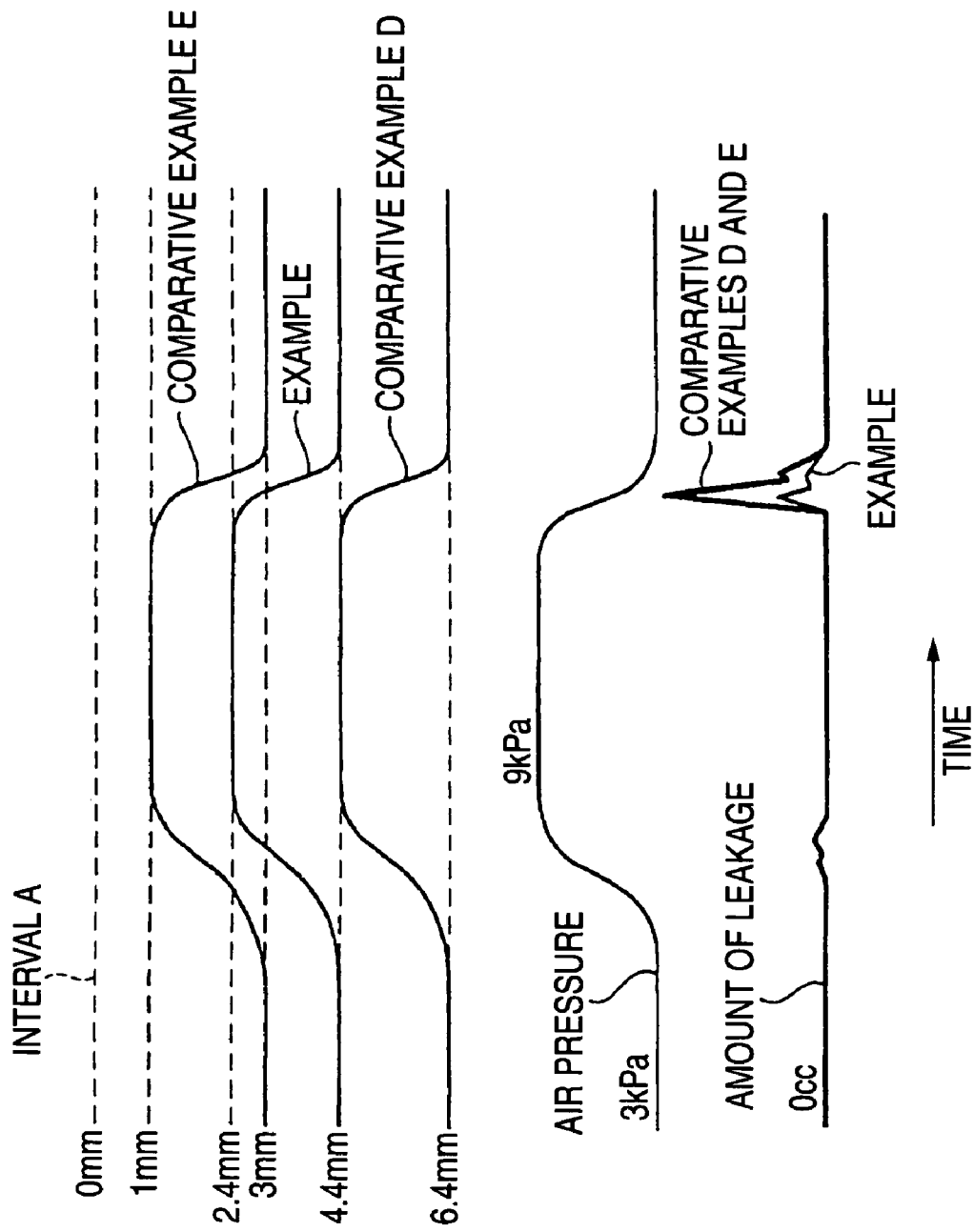

CUT VALVE

BACKGROUND OF THE INVENTION

1. Field of the Invention

The present invention relates to a cut valve which is installed on a fuel tank of an automobile or the like and is adapted to shut off a vent passage between the interior of the fuel tank and the outside when the fuel level in the fuel tank has risen, so as to prevent leakage to the outside.

2. Description of the Related Art

A fuel tank of an automobile is provided with a fuel vapor pipe for discharging fuel vapor to a canister through a cut valve and a check valve when the internal pressure has exceeded a predetermined value. The cut valve is provided to prevent the fuel in the fuel tank from leaking to the outside through the fuel vapor pipe when the automobile turned or tilted. Namely, the cut valve has a float valve in its interior, and when the fuel level has risen, the float valve is adapted to rise to shut off a vent passage communicating with the fuel vapor pipe.

Japanese Patent No. 2972385 discloses a method of manufacturing such a fuel cutoff valve (hereafter referred to as the cut valve). In its embodiment, a cut valve is disclosed which is assembled such that a float having a projecting portion (valve element) capable of opening and closing a first through hole (valve seat), which allows a communicating passage open to the outside and the interior of the valve body to communicate with each other, is disposed in a substantially cylindrical valve body having the communicating passage and having one end closed and the other end open, and the other end side is closed by a cover member having a hole.

However, with the above-described conventional cut valve, if the vehicle makes a quick turn, tilts greatly, is rolled over, or travels on a road surface having large irregularity, the fuel in the fuel tank sways greatly, so that the float is unable to follow the swaying motion of the fuel, making it impossible to completely prevent the leakage of fuel to the vapor pipe side through the vent passage.

SUMMARY OF THE INVENTION

An object of the invention is to provide a cut valve which makes it possible to more reliably prevent the leakage of the fuel to the outside even if the fuel inside the fuel tank sways greatly due to the turning, tilting, or the like of the automobile.

To attain the above object, in accordance with a first aspect of the invention there is provided a cut valve which is installed on a fuel tank and is adapted to shut off a vent passage between the interior of the fuel tank and the outside when a fuel level in the fuel tank has risen, including: a housing having: a cover having a lead-out pipe connected to an external pipe; a tubular body provided with a ceiling portion connected to a lower side of the cover and having a vent hole communicating with the lead-out pipe; and a bottom portion closing a lower surface of the tubular body; and a float valve which is slidably accommodated in the housing and is adapted to open or close the vent hole by coming into contact with and moving away from a valve seat provided at a peripheral edge of the vent hole in the ceiling portion, wherein: an inner periphery of the valve seat has a tapered shape in which its diameter is gradually enlarged in a direction toward the float valve at an angle of 31 to 34 degrees with respect to an axis of the vent hole; and at least one of the float valve and a portion of the housing with which the float valve comes into contact during its sliding is formed of a resin material of a sliding grade.

According to the above-described first aspect of the invention, when the fuel level rises due to the tilting or swaying motion of the fuel inside the fuel tank, and the float valve is thereby immersed in the fuel, the float valve floats up due to its buoyancy with respect to the fuel and abuts against the valve seat at the peripheral edge of the vent hole, thereby closing the vent hole and preventing the fuel from leaking to the outside.

In that case, since the inner periphery of the valve seat has a tapered shape in which its diameter is gradually enlarged in the direction toward the float valve at an angle of 31 to 34 degrees with respect to the axis of the vent hole, the head of the float valve can easily be brought into close contact with the inner periphery of the valve seat, which improves sealability. In addition, it is possible to prevent the float valve from being fitted tightly to the inner periphery of the valve seat and becoming difficult to come off.

In addition, since at least one of the float valve and a portion of the housing with which the float valve comes into contact during its sliding is formed of a resin material of a sliding grade, the coefficient of friction becomes small, and when the float valve is immersed in the fuel and the buoyancy is added, the float valve slides smoothly and comes to float up.

For this reason, even if the fuel sways greatly and intensely inside the fuel tank due to the turning, tilting, or the like of the automobile, the float valve slides smoothly. Therefore, the opening and closing operation of the vent passage between the interior of the fuel tank and the outside can be effected reliably.

In addition, as a result of using a resin material of a sliding grade, the wear resistance improves, and the amount of wear of the head of the float valve and the valve seat abutting against it declines. For this reason, even if the cut valve is used for long periods of time, a clearance is difficult to occur between the float valve and the valve seat, and it is possible to suppress a decline in the sealability between the float valve and the valve seat.

In accordance with a second aspect of the invention there is provided a cut valve wherein, in the first aspect of the invention, the resin material of a sliding grade is one in which a lubricant selected from silicone-, paraffin-, fatty acid ester-, and molybdenum dioxide-based lubricants is added to a resin selected from polybutylene terephthalate (PBT), polyphenylene sulfide (FPS), polyamide (PA) polyoxymethylene (POM), and polycarbonate (PC).

According to the above-described second aspect of the invention, since the above-described material is used as the resin material of a sliding grade, it is possible to obtain a cut valve in which not only are its coefficient of friction and amount of wear lowered, but such properties as high strength, heat resistance, dimensional stability, solvent resistance, and fuel permeation resistance are added depending on the intended use and application.

In accordance with a third aspect of the invention there is provided a cut valve wherein, in the first or second aspect of the invention, ribs are formed along an axial direction on an outer periphery of the float valve and project upwardly of an upper surface of the float valve, and wherein a protruding portion is formed in a center of the ceiling portion of the housing in such a manner as to protrude toward the float valve, and a recessed portion for accommodating projecting portions of the ribs of the float valve is formed around an outer periphery of the protruding portion.

According to the above-described third aspect of the invention, a protruding portion is formed in a center of the ceiling portion of the housing in such a manner as to protrude toward the float valve, and a recessed portion for accommodating projecting portions of the ribs of the float valve is formed around an outer periphery of the protruding portion. Therefore, it is possible to make small an interval between the upper surface of the float valve and the ceiling portion of the tubular body when the float valve has floated up and closed the vent hole. When the float valve floats up by being immersed in the fuel and closes the vent hole in the ceiling portion of the housing, the fuel enters the gap between the upper surface of the float valve and the ceiling portion of the tubular body as well. At that time, when the float valve drops and the vent hole is opened again, there have been cases where the fuel accumulated in that gap is sucked into the vent hole due to a pressure difference or the like and leaks to the outside. However, by making that gap small, it becomes possible to minimize the fuel leakage. In addition, as the ribs on the outer periphery of the float valve are made to project from the upper surface of the float valve, the sliding guidability of the float valve is made excellent, and the float valve can be raised or lowered without being tilted.

In accordance with a fourth aspect of the invention there is provided a cut valve wherein, in the third aspect of the invention, an interval between the upper surface of the float valve and the protruding portion of the tubular body in a state in which the float valve has floated up and closed the vent hole is 2 to 3 mm.

According to the above-described fourth aspect of the invention, since the aforementioned interval is set to 2 to 3 mm, the amount of fuel accumulated in that gap can be made small, and it is possible to effectively prevent the fuel from leaking to the outside when the float valve opens. When the fuel dropped, the float valve can be made to move quickly away from the ceiling portion of the housing.

According to the cut valve of the invention, in cases such as where the fuel in the fuel tank has tilted, the fuel level rises, and the float valve floats up and abuts against the valve seat to close the vent hole, thereby preventing the fuel leakage. Also, at least one of the float valve and a portion of the housing with which the float valve comes into contact during its sliding is formed of a resin material of a sliding grade. Therefore, the coefficient of friction is small, the float valve slides smoothly, and even in the case where the fuel tilts greatly, the opening and closing operation of the vent passage between the interior of the fuel tank and the outside can be effected reliably. In addition, since at least one of the relevant parts is formed of a resin material of a sliding grade, the wear resistance improves, and even in the case where the cut valve is used for long periods of time, it is possible to suppress a decline in the sealability between the float valve and the valve seat. In addition, since the inner periphery of the valve seat has a tapered shape in which its diameter is gradually enlarged in the direction toward the opening at an angle of 31 to 34 degrees with respect to the axis of the vent hole, the float valve is made not difficult to come off the inner periphery of the valve seat, and the float valve comes into contact with the inner periphery of the valve seat with an appropriate contact area. Therefore, it becomes possible to sufficiently ensure the sealability between the float valve and the valve seat.

BRIEF DESCRIPTION OF THE DRAWINGS

These and other objects and advantages of this invention will become more fully apparent from the following detailed description taken with the accompanying drawings in which:

FIGS. 5A and 5B illustrate a test on sealability between the float valve and the valve seat when the cut valve is tilted, in which FIG. 5A is an explanatory diagram of a case where the fuel level is in a horizontal state, and FIG. 5B is an explanatory diagram of a case where the fuel tank is tilted clockwise;

FIGS. 7A and 7B illustrate a test on the sealability of the cut valve between the float valve and the valve seat in a case where the fuel in the fuel tank sways, in which FIG. 7A is an explanatory view of a case where the fuel tank is tilted 17° with respect to the fuel level, and FIG. 7 is an explanatory diagram illustrating the cycle of the sealability test;

FIGS. 8A and 8B illustrate a test on the sealability of the cut valve between the float valve and the valve seat in a case where the fuel in the fuel tank sways, in which FIG. 8A is an explanatory diagram of a case where the fuel level is in the horizontal state, and FIG. 8A is an explanatory view of a case where the fuel tank is tilted 40° with respect to the fuel level; and FIG. 9 is an explanatory diagram illustrating the results after one cycle in a test on the sealability of the cut valve between the float valve and the valve seat in a case where the fuel in the fuel tank sways.

DETAILED DESCRIPTION OF THE PREFERRED EMBODIMENTS

Referring now to FIGS. 1 to 4, a description will be given of an embodiment of a cut valve in accordance with the invention.

Figure 1:
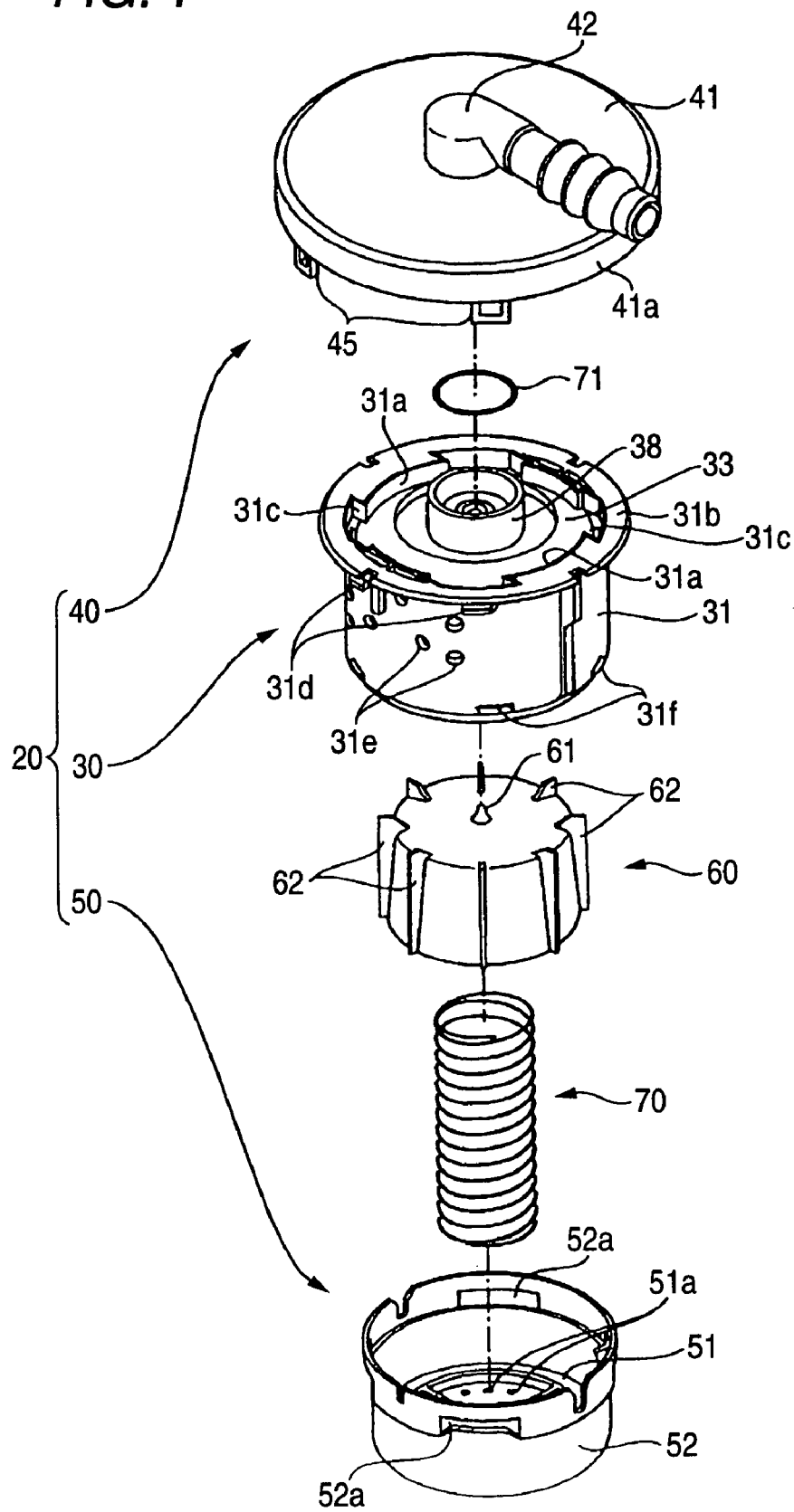
FIG. 1 is an exploded perspective view illustrating a cut valve in accordance with an embodiment of the invention.

As shown in FIG. 1, this cut valve 10 mainly includes a housing 20 and a float valve 60 accommodated in the housing 20.

Figure 2:
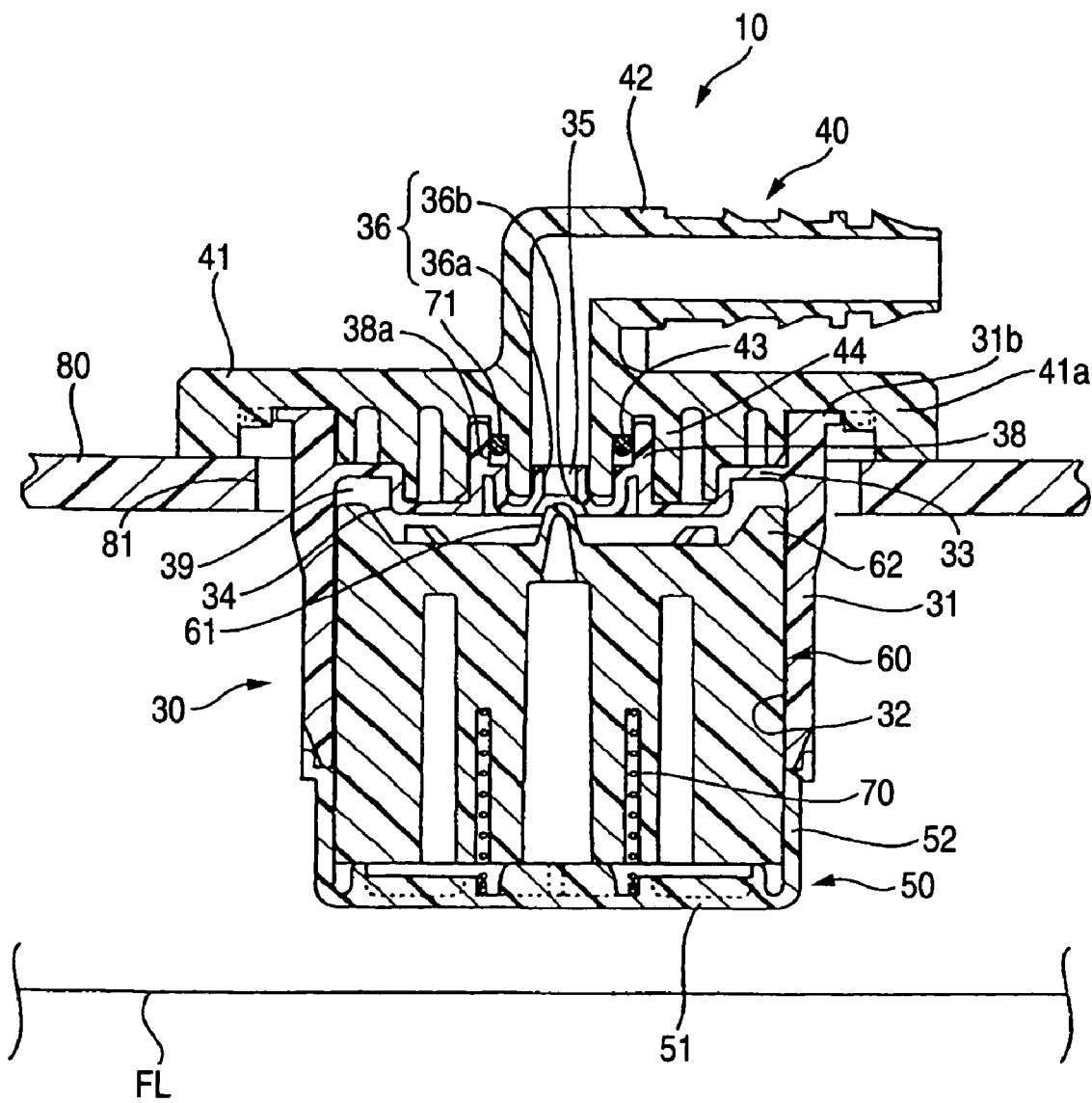
FIG. 2 is a cross-sectional view illustrating a state in which the cut valve is mounted in a fuel tank, and a float valve has not floated up.

Referring also to FIG. 2, the housing 20 includes a tubular body 30 having a ceiling portion 33 at one end thereof and an opening 32 at the other end thereof; a cover 40 connected to the upper side of the ceiling portion 33 of the tubular body 30; and a bottom portion 50 closing the opening of the tubular body 30.

The tubular body 30 has a cylindrical peripheral wall 31, and the ceiling portion 33 is formed integrally with the peripheral wall 31. A flange portion 31b is formed on a peripheral edge portion of this ceiling 33 through ribs 31a provided uprightly at predetermined intervals in the circumferential direction. Further, insertion holes 31c, into which engaging pieces 45 of the cover 40, which will be described later, are respectively inserted, are formed in the respective gaps between the ribs 31a. Cover-use pawl portions 31d, which project from the peripheral wall 31, are respectively formed below the insertion holes 31c, and the engaging pieces 45 of the cover 40 are adapted to be engaged therewith. Further, a plurality of through holes 31e are formed in the peripheral wall 31 and serves as passage holes for fuel vapor and fuel.

The bottom portion 50 is adapted to be fitted in the opening 32 at the lower side of the peripheral wall 31. Further, a plurality of bottom portion-use pawl portions 31f are formed at a lower edge portion of the peripheral wall 31 at predetermined intervals in the circumferential direction, and are adapted to engage engaging holes 52a in the bottom portion 50, which will be described later.

The ceiling portion 33 has a protruding portion 34 which is formed in such a manner as to bulge with a predetermined diameter from the center of the ceiling portion 33 toward the float valve 60 side. A recessed portion 39 is formed around an outer periphery of this protruding portion 34, and ribs 62 of the float valve 60, which will be described later, are adapted to be accommodated therein.

In addition, the protruding portion 34 has a vent hole 35 in its center. A valve seat 36 is formed around a peripheral edge of this vent hole 35, and a head 61 of the float valve 60 is adapted to abut against it when the fuel level rises.

The valve seat 36 has a straight pipe portion 36a provided uprightly in a direction away from the float valve 60 and a tapered seal portion 36b whose diameter is gradually enlarged in the direction toward the float valve 60. The straight pipe portion 36a is inserted into a lead-out pipe 42 of the cover 40, which will be described later, so as to allow the vent hole 35 and a vent passage in the lead-out pipe 42 to communicate with each other.

Figure 3:
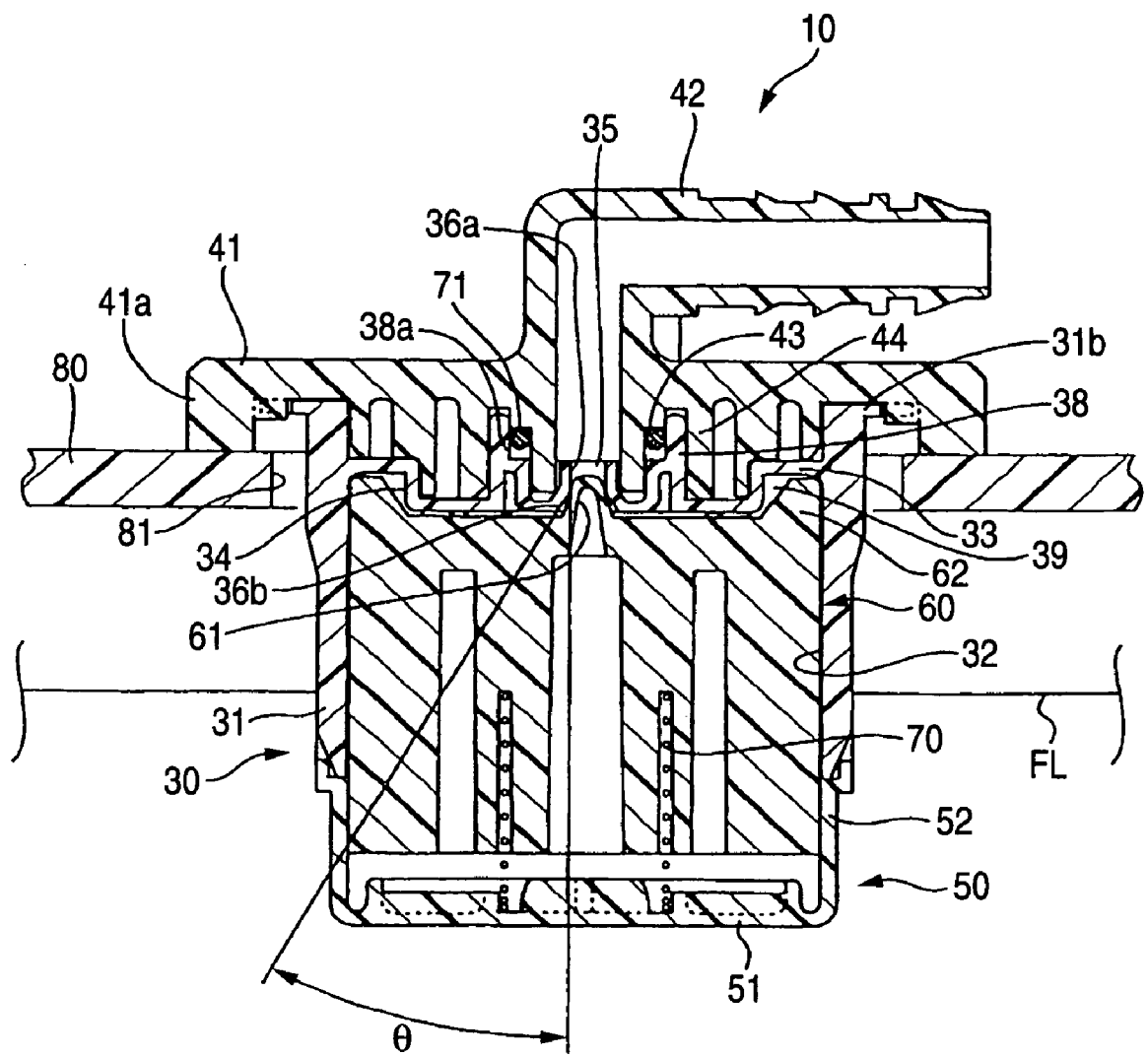
FIG. 3 is a cross-sectional view illustrating a state in which the cut valve is mounted in the fuel tank, and the float valve has floated up and closed a vent hole.
Figure 4:
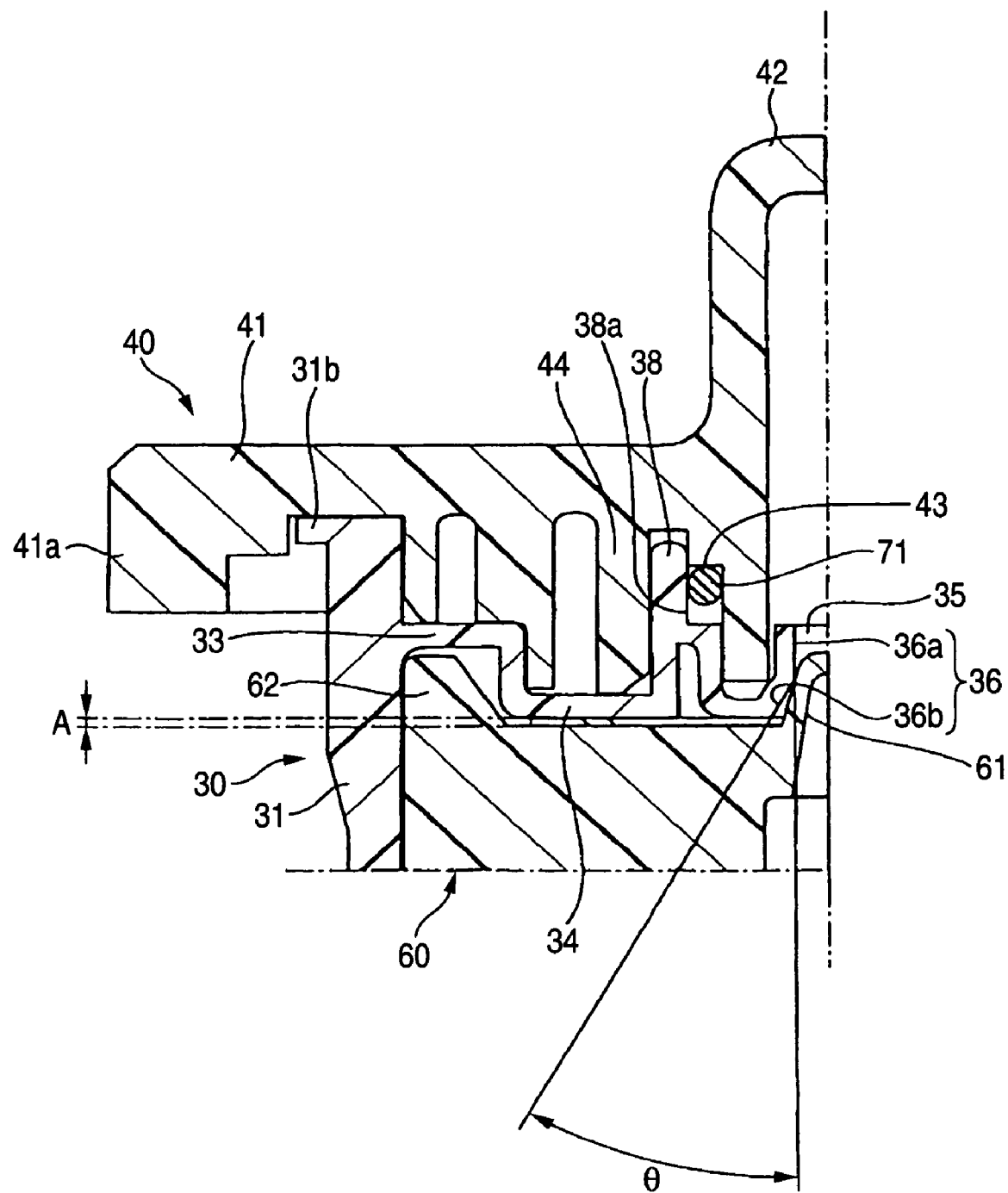
FIG. 4 is a partially enlarged view of a valve seat and its periphery when the float valve of the cut valve has floated up.

More specifically, as shown in FIGS. 3 and 4, the seal portion 36b at the inner periphery of the valve seat 36 has a tapered shape in which its diameter is gradually enlarged in the direction toward the float valve 60 at an angle of $\theta=31$ to 34 degrees with respect to the axis of the vent hole 35. Since the seal portion 36b at the inner periphery of the valve seat 36 is thus formed as the tapered surface at the aforementioned angle, the head 61 and the seal portion 36b can easily be brought into close contact with each other when the float valve 60 has risen in conjunction with the rise of the fuel level and its head 61 has abutted against the seal portion 36b. Hence, it is possible to improve the sealability when the valve is closed. In addition, when the fuel level has dropped, the head 61 of the float valve 60 quickly moves away from the seal portion 36b to open the valve, thereby improving the response.

It should be noted that in a case where the aforementioned angle $\theta$ is less than 31 degrees, the head 61 of the float valve 60 is firmly fitted to the inner periphery of the seal portion 36b of the valve seat 36 and becomes difficult to come off. Hence, the response of the valve can possibly decline when the fuel level has dropped. This tendency is noticeable particularly in a case where the float valve 60 is a material which is likely to swell when it is immersed in the fuel. On the other hand, if the aforementioned angle $\theta$ exceeds 34 degrees, the sealability at the time when the head 61 of the float valve 60 has abutted against the inner periphery of the seal portion 36b declines, and the fuel is likely to leak to the outside during a sudden rise in the fuel level.

In addition, an annular rib 38 is provided uprightly in the center of the upper surface of the ceiling portion of the tubular body 30 so as to surround the valve seat 36 at a predetermined interval from the valve seat 36. A stepped portion 38a is formed on an inner periphery of this rib 38, and a seal ring 71 is adapted to be fitted on this stepped portion 38a.

The cover 40 has a substantially cylindrical plate portion 41, and an annular rib 41a is formed in such a manner as to extend downward from a peripheral edge of this plate portion 41. As shown in FIG. 2, this annular rib 41a is a portion which is abutted against and welded to a peripheral edge of a mounting hole 81 formed in a fuel tank 80 when the cut valve 10 of the invention is mounted on the fuel tank 80.

In addition, the lead-out pipe 42 is formed in an inverse L shape in such a manner as to be led through the plate portion 41. This lead-out pipe 42 has a vent passage formed therein and is capable of discharging fuel vapor to the outside. An external pipe or the like is connected to its outer part and is adapted to be connected to an unillustrated canister or the like.

A proximal end portion of the lead-out pipe 42 extends downward from the center of a lower surface of the plate portion 41, and a stepped portion 43 is formed at its peripheral edge. Further, an annular peripheral wall 44 is formed on the lower surface of the plate portion 41 at a predetermined interval from an outer periphery of the lead-out pipe 42 extending from the lower surface of the plate portion 41. Still further, engaging pieces 45 are formed on the lower surface of the plate portion 41 in such a manner as to extend downward front the lower surface of the plate portion 41 at a predetermined interval from an outer periphery of the annular peripheral wall 44 and to be arranged at predetermined intervals in the circumferential direction. These engaging pieces 45 are respectively inserted into the plurality of insertion holes 31 formed in the tubular body 30 and are engaged with the cover-use pawl portions 31d of the tubular body 30, so as to fit the cover 40 to the tubular body 30.

If this cover 40 is fitted to the tubular body 30, the straight pipe portion 36a of the valve seat 36 is inserted to the inner periphery of the proximal end portion of the lead-out pipe 42, and the rib 38 on the ceiling portion 33 is inserted into the gap between the stepped portion 43 and the annular peripheral wall 44 of the cover 40. Consequently, as shown in FIG. 2, the gap between the cover 40 and the tubular body 30 is airtightly sealed by the seal ring 71 fitted on the stepped portion 38a on the inner periphery of the rib 38.

The bottom portion 50 is formed by a substantially circular bottom wall 51 and a peripheral wall 52 provided uprightly from a peripheral edge of this bottom wall 51. The bottom wall 51 has through holes 51a through which the fuel and the fuel vapor are capable of passing. In addition, the engaging holes 52a are formed in the peripheral wall 52, and when the bottom portion 50 is fitted to the lower surface of the peripheral wall 31 of the tubular body 30, the bottom portion-use pawl portions 31f are fitted in the engaging holes 52a, thereby allowing the bottom portion 50 to be fitted to the lower surface of the tubular body 30.

The float valve 60 is accommodated in the tubular body 30 so as to be slidable relative to the peripheral wall 31 of the tubular body 30, and so as to be brought into contact with and move away from the valve seat 36. This float valve 60 has a substantially cylindrical shape, and the head 61 is projectingly provided on a central portion of its upper surface. Further, the ribs 62 are formed along the axial direction on an outer periphery of the float valve 60 at predetermined intervals, and these ribs 62 project upwardly of an upper surface of the float valve 60.

As described before, the protruding portion 34 formed in the center of the ceiling portion 33 and the recessed portion 39 formed around the outer periphery of this protruding portion 34 are both formed in the tubular body 30. Therefore, it is possible to make as small as possible the interval between the upper surface of the float valve 60 and the ceiling portion 33 of the tubular body 30 when the float valve 60 has closed the vent hole 35 by float up and abutting against the seal portion 36b of the valve seat 36.

Consequently, when the fuel level has risen and the float valve 60 has floated up due to the tilting or swaying motion of the fuel inside the fuel tank 80, it becomes difficult for the fuel to flow into the space between the float valve 60 and the ceiling portion 33 of the tubular body 30, and the amount of its influx becomes small. For this reason, when the fuel level drops and the float valve 60 is lowered to open the vent hole 35, it is possible to suppress the fuel leakage due to the fact that the fuel is sucked into the vent hole 35 owing to a pressure difference and the like.

It should be noted that an interval A between the upper surface of the float valve 60 and the protruding portion 34 of the tubular body 30 at the time when the float valve 60 has floated up and closed the vent hole 35 should preferably be 2 to 3 mm (see FIG. 4). According to this arrangement, it is possible to suppress the leakage to the outside of the fuel which flowed into the space between the float valve 60 and the ceiling portion 33 of the tubular body 30. Also, it is possible to satisfactorily maintain the response when the float valve 60 is lowered.

It should be noted that I the aforementioned interval A is smaller than 2 mm, the space formed by the float valve 60 and the ceiling portion 33 of the tubular body 30 has a very small volume. In that case, when the fuel level drops and the float valve 60 is lowered, it becomes difficult for the float valve 60 to move away from the ceiling portion 33, and the response at the time when the valve opens becomes poor. On the other hand, if the aforementioned interval A is larger than 3 mm, the fuel becomes likely to flow into the space between the float valve 60 and the ceiling portion 33 of the tubular body 30, so that the amount of fuel leakage from the vent hole 35 in the tubular body 30 during the opening and closing of the valve undesirably becomes large.

In addition to the above-described float valve 60, a spring 70 is adapted to be accommodated in the tubular body 30. This spring 70 is interposed between the float valve 60 and the bottom portion 50 to impart an upwardly urging force to the float valve 60. In addition, in a state in which the float valve 60 is not immersed in the fuel, the float valve 60 compresses the spring 70 by its own weight and assumes a state in which the float valve 60 is placed on the bottom portion 50. When the fuel level FL rises due to the tilting or swaying notion of the fuel inside the fuel tank 80, and the float valve 60 is thereby immersed in the fuel, the float valve 60 rises due to the buoyancy of the float valve 60 and the urging force of the spring 70 (see FIG. 3). As a result, the head 61 of the float valve 60 abuts against the seal portion 36b of the valve seat 36 formed in the tubular body 30 and closes the vent hole 35, thereby preventing the fuel from leaking to the outside of the fuel tank 80.

It should be noted that in cases such as where, as shown in FIG. 2, the fuel inside the fuel tank 80 does not sway and the fuel level FL retains horizontal, it the pressure within the fuel tank 80 exceeds a predetermined value owing to fuel vapor occurring in the fuel tank 80, the fuel vapor is discharged to such as a check valve and a canister, which are connected to the outside and are not shown, through the through hole 51a in the bottom portion 50, the space formed by the float valve 60 and the ceiling portion 33, and the vent passage in the lead-out pipe 42.

In the case of this embodiment, since the cut valve is used for a resin tank, the cover 40 is formed of an olefin-based resin such as polyethylene or polypropylene so that the cover 40 can be welded to a resin-made fuel tank formed of polyethylene or the like. In addition, as for the bottom portion 50, a fuel permeation resistant resin material, through which fuel vapor is difficult to permeate, such as polyacetal (POM) polyamide (PA), or other similar resin, is used.

In the cut valve 10 of the intention, at least one of the float valve 60 and portions of the housing 20 with which the float valve 60 comes into contact during its sliding, i.e., the peripheral wall 31 and the valve seat 36 of the tubular body 30, is formed of a resin material of a sliding grade. The sliding grade referred to herein means a material to which friction resistance and wear resistance, in particular, have been imparted among resin materials, and which is used for a gear, bearing, or the like, for example.

Since such a resin material of the sliding grade is used for the aforementioned portions, the coefficients of friction of the peripheral wall 31 of the tubular body 30 and the float valve 60 become small. Thus, when the float valve 60 is immersed in the fuel and the buoyancy is added to the float valve 60, the float valve 60 slides smoothly and comes to float up. For this reason, with the cut valve 10 of the invention, the float valve 60 slides smoothly even if the turning, tilting, or other similar motion of the automobile is large, and the fuel is tilted greatly or sways greatly in the fuel tank 80, or the rate of the swaying motion of the fuel becomes high. Therefore, the opening and closing operation of the vent passage between the interior of the fuel tank 80 and the outside can be effected reliably.

In addition, since at least one of the float valve 60 and the valve seat 36 provided in the tubular body 30 is formed of a resin material of a sliding grade, the wear resistance improves, and the amount of wear of the head 61 of the float valve 60 or the seal portion 36b of the valve seat 36 abutting against it declines. For this reason, even if the cut valve 10 is used for long periods of time, a clearance is difficult to occur between the float valve 60 and the valve seat 36, and it is possible to suppress a decline in the sealability between the float valve 60 and the valve seat 36.

It should be noted that the resin material of a sliding grade may be used for either one of the float valve 60 and the peripheral wall 31 and the valve seat 36 of the tubular body 30. However, if it is used for the float valve 60, the amount of material used increases, so that the manufacturing cost can be decreased if this material is used in the molding of the tubular body 30.

Preferably, the resin material of a sliding grade is a material selected from sliding-grade resins including polybutylene terephthalate (PBT), polyphenylene sulfide (PPS), polyamide (PA), polyoxymethylene (POM), and polycarbonate (PC). By using the aforementioned resin material, it is possible to obtain the cut valve 10 in which not only are its coefficient of friction and amount of wear lowered, but such properties as high strength, heat resistance, dimensional stability, solvent resistance, and fuel permeation resistance are added depending on the intended use and application.

In addition, more preferably, the above-described resin material of a sliding grade is one in which a lubricant such as a silicone-, paraffin-, fatty acid ester-, or molybdenum dioxide-based lubricant is added to the aforementioned resin material. As such, since the lubricant just mentioned is added to the resin material, it is unnecessary to apply a lubricant such as grease to the float valve 60 or the portions of the housing 20 with which the float valve 60 comes into contact during its sliding, i.e., the peripheral wall 31 and the valve seat 36 of the tubular body 30. Thus, it is possible to obtain the cut valve 10 which makes it possible to maintain the sliding performance even if the float valve 60 is immersed in the fuel, and which can be suitably used in the fuel tank 80.

In addition, as the resin material of a sliding grade, it is possible to use one whose slidability is improved by providing, for example, on the surface of at least one of the float valve 60 and the valve seat 36 of the tubular body 30 a coating of diamond-like carbon (DLC) whose principal component is carbon and whose coefficient of friction is low, a coating of polytetrafluoroethylene (PTFE), graphite, ceramic, or the like, or an ion coating of titanium nitride, aluminum, or the like. The resin material of a sliding grade in accordance with the invention is thus to be construed to include a resin material provided with slidability by a coating film on the surface. Further, the resin material may be one which contains glass fibers or the like.

It should be noted that the resin materials of the sliding grade are commercially available from various companies, including such as "CS Series" (tradename, made by Sumitomo Dow Limited) which is a sliding grade of polycarbonate; "Tenac-C LZ750" (tradename, made by Asahi Kasei Chemicals Corporation) which is a sliding grade of polyacetal; "MC Nylon MC703HL" (tradename, made by Nippon Polypenco Limited) which is a sliding grade of polyamide. In the invention, it is possible to use these commercially available products.

Various Performances of the cut valve 10 in accordance with the invention were tested.

First, cut valves in accordance with the Example and Comparative Examples A to E were fabricated as shown below.

Example

The cut valve shown in FIG. 1 was fabricated. At that juncture, the tubular body 30 was formed by using a polyoxymethylene (POM) based resin material of a sliding grade. Further, the seal portion 36b of the valve seat 36 was formed with an angle θ of 33.5° with respect to the axis of the vent hole 35 of the tubular body 30. In addition, the cover 40 was formed of polyethylene, and the float valve 60 and the bottom portion 50 were formed of ordinary polyoxymethylene (POM) which was not a sliding grade. It should be noted that the interval A between the upper surface of the float valve 60 and the protruding portion 34 of the tubular body 30 was 2.4 mm when the vent hole 35 was closed by abutting the head 61 against the seal portion 36b of the valve seat 36.

Comparative Example A

A cut valve similar to that of the Example was fabricated with the exception that the aforementioned angle θ was set to 28.0°.

Comparative Example B

A cut valve similar to that of the Example was fabricated with the exception that the aforementioned angle θ was set to 39.7°.

Comparative Example C

A cut valve similar to that of the Example was fabricated with the exception that the tubular body 30 was formed of ordinary polyoxymethylene (POM) which was not a sliding grade.

Comparative Example D

A cut valve similar to that of the Example was fabricated with the exception that the aforementioned interval A was set to 4.4 mm.

Comparative Example E

A cut valve similar to that of the Example was fabricated with the exception that the aforementioned interval A was set to 1.0 mm.

It should be noted that the relationship among the presence or absence of use of the resin material of a sliding grade, the angle θ, and the interval A in the above-described Example and Comparative Examples A to E is shown in Table 1 below.

TABLE 1

| | Angle θ(°) 28.0 Sliding Grade Used | Angle θ(°) 33.5 Sliding Grade Used | Angle θ(°) 33.5 Ordinary Product used | Angle θ(°) 39.7 Sliding Grade Used |
|---|---|---|---|---|
| Interval A (mm) 1.0 | — | Comparative Example E | — | — |
| Interval A (mm) 2.4 | Comparative Example A | Example | Comparative Example C | Comparative Example B |
| Interval A (mm) 4.4 | — | Comparative Example D | — | — |

Various performances of the cut valves were tested by using the cut valves of the above-described Example and Comparative Examples Test 1

With respect to the cut valves of the above-described Comparative Examples A to C and the Example, a test was conducted on the sealability between the float valve and the valve seat when the cut valve was tilted.

The fuel was filled in the fuel tank, and each of the aforementioned cut valves was mounted on an upper wall of the fuel tank. At that juncture, the distance from the bottom surface of the cut valve to the fuel level FL was set to D, as shown in FIGS. 5A and 5B.

Figure 5A:
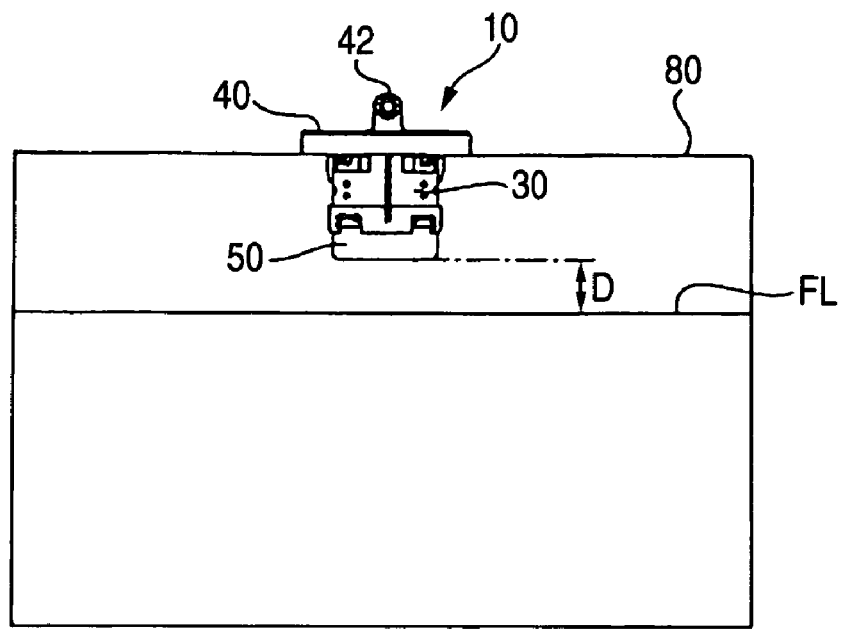
Figure 5B:
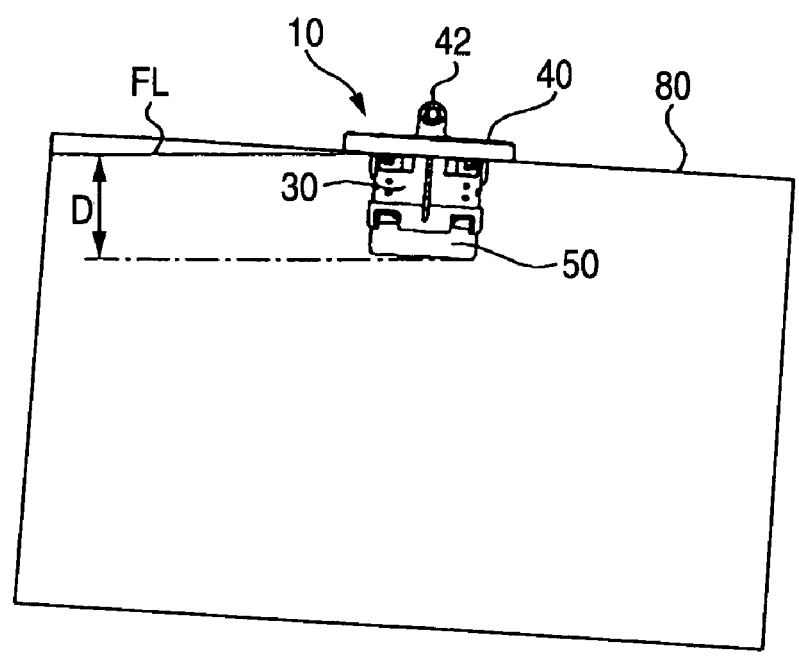

The distance D was set in a range of −16 mm to 20 mm (it should be noted that the sign '−' in the distance D denotes a state in which the bottom surface of the cut valve is not immersed in the fuel, i.e., is located above the fuel level FL; see FIG. 5A). The fuel tank was installed on a rotatively driving apparatus having a motor and the like, and the fuel tank was rotated in the following cycle. Namely, as shown in FIG. 5B, the fuel tank with the cut valve mounted thereon (hereafter, this assembly will be referred to as the test piece) was rotated clockwise at a velocity of 30 degrees/minute, and when it was tilted 90 degrees from the initial position, the test piece was stopped at that position for five minutes. Then, the test piece was further rotated clockwise at the same velocity, and when it was tilted 180 degrees from the initial position, the test piece was stopped for five minutes. The test piece was further rotated clockwise at the same velocity, and when it was tilted 270 degrees from the initial position, the test piece was stopped for five minutes. After the test piece was thus tilted 270 degrees, this time the test piece rotated counterclockwise in the above-described procedure the cycle, and was returned to the initial position.

The above-described cycle was repeated three times for each fuel level with respect to each cut valve, and the amount of fuel leakage from the valve seat 36 at that time was measured. Averages of the respective amounts of fuel leakage are shown in table 2 below.

TABLE 2

| Distance D (mm) | Amount of Leakage (cc) | | | |
|---|---|---|---|---|
| | Comparative Example B | Comparative Example C | Comparative Example A | Example |
| −16 | 0.0 | 0.0 | 0.0 | 0.0 |
| −15 | 0.0 | 0.0 | 0.0 | 0.0 |
| −14 | 0.0 | 0.0 | 0.0 | 0.0 |
| −11 | 0.0 | 0.0 | 0.0 | 0.0 |
| −7 | 0.0 | 0.0 | 0.0 | 0.0 |
| −3 | 8.0 | 0.0 | 0.0 | 0.0 |
| 1 | 0.0 | 0.0 | 0.0 | 0.0 |
| 6 | 7.7 | 0.0 | 0.0 | 0.0 |
| 13 | 3.3 | 6.0 | 0.0 | 0.1 |
| 20 | 4.0 | 0.0 | 3.0 | 0.0 |

From the above table 2, it can be understood that, in the cut valve in accordance with the Example, 0.1 cc of fuel leaked only in the case where the distance D was 13 mm, and that the sealability between the float valve 60 and the valve seat 36 improved in comparison with the Comparative Examples A to C.

Test 2

The ease of sliding of the float valve 60 was tested with respect to the cut valves of the Comparative Example C and the Example.

With respect to the cut valves of the Comparative Example C and the Example, measurement was made of the height of the fuel level FL when the float valve 60 abutted against the seal portion 36b of the valve seat 36 after the fuel level FL rose and the float valve 60 floated up, by varying the mount angle of the cut valve at 0°, 8°, and 17°, respectively.

Figure 6:
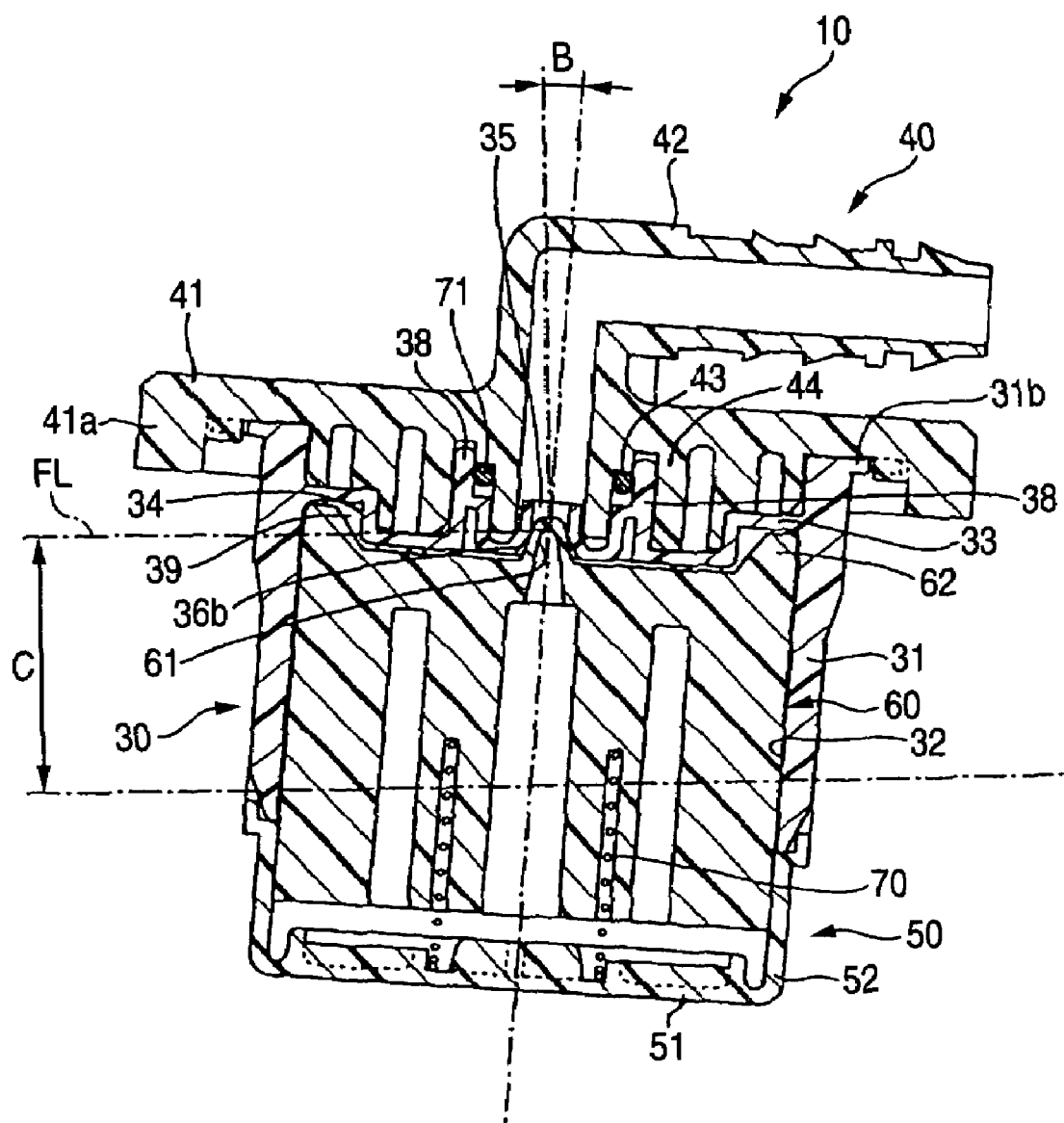
FIG. 6 is a cross-sectional view explaining the height between the fuel level and the abutted portion when the float valve floated up and abutted against a seal portion in a test for confirming the ease of sliding of the float valve when the cut valve is tilted.

It should be noted that the aforementioned mounting angle means an angle B of the axis of the vent hole 35 with respect to a direction perpendicular to the fuel level FL (see FIG. 6). In addition, the height refers to the height C between the fuel level FL and the abutted portion when the float valve 60 floated up and abutted against the seal portion 36b of the valve seat 36, as shown in FIG. 6. The results are shown in Table 3 below.

TABLE 3

| Angle (°) | Height C (mm) | |
|---|---|---|
| | Comparative Example C | Example |
| 0 | 17.72 | 17.73 |
| 8 | 22.21 | 20.85 |
| 17 | 25.57 | 24.58 |

From the above Table 3, it can be understood that, in the cut valve of the Embodiment, the height C is small, and that the float valve 60 smoothly slides by quickly responding to the rise of the fuel level FL.

Test 3

With respect to the cut valves of the above-described Comparative Examples A and B and example, measurement was made of the reliability of the opening and closing operation of the vent hole 35 of the float valve 60 as to whether or not the float valve 60 returns to its original position after abutting against the valve seat 36.

The cut valve was mounted on an upper wall of an empty fuel tank in which the fuel was not filled, the fuel tank was inverted, and the float valve 60 was caused to abut against the seal portion 36b of the valve seat 36 to close the vent hole 35. Subsequently, the fuel tank was returned to its original state to lower the air pressure, and with respect to the cut valves of the Comparative Examples A and B and the Example a test was conducted to determine whether or not the float valve 60 returned to its original position until the pressure reached 22 kPa. The results are shown in Table 4 below. It should be noted that the circle 'o' in the Table shows a case in which the float valve 60 after abutting against the valve seat 36 positively dropped to the original position while the pressure dropped from 30 kPa to 22 kPa. Meanwhile, the cross 'x' in the Table shows a case in which after the float valve 60 abutted against the valve seat 36, even after the application of pressure was terminated, the head 61 of the float valve 60 remained fitted to the valve seat 36 and failed to drop to the original position.

TABLE 4

| | Comparative Example A | Comparative Example B | Example |
|---|---|---|---|
| Success or failure of opening/closing operation | o | x | o |

From the above Table 4, it can be understood that, in the cut valve of the Example, the floating-up and lowering operation of the float valve 60 is effected positively, and that the opening and closing operation of the vent passage between interior of the fuel tank and the outside is effected reliably.

Test 4

A wear test was conducted with respect to the cut valves of the above-described Comparative Example C and Example.

The cut valve was mounted on a vibration tester, and the cut valve was vibrated 400,000 times in the vertical direction with a frequency of 20 Hz and an acceleration of 1.8 G. Then, the cut valve was vibrated 400,000 times in the horizontal direction with a frequency of 20 Hz and an acceleration of 0.9 G. Then, measurement was made of the depth of wear (difference between the dimension before the test and the dimension after the test) of the head 61 of the float valve 60 and the seal portion 36b of the valve seat 36. The results are shown in Table 5 below.

TABLE 5

| | Depth of Wear (mm) | |
|---|---|---|
| | Seal Portion of Valve Seat | Valve Element of Float Valve |
| Comparative Example C | 0.04 | 0.16 |
| Example | 0.03 | 0.05 |

From the above Table 5, it can be understood that, in the cut valve of the Example, the depth of wear of the head 61 of the float valve 60 and the seal portion 36b of the valve seat 36 is small, and that their wear resistance is improved.

Test 5

With respect to the cut valves of the above-described Comparative Examples D and E and Example, the sealability of the float valve 60 and the valve seat 36 was tested in a case where the fuel in the fuel tank swayed.

Figure 7A:
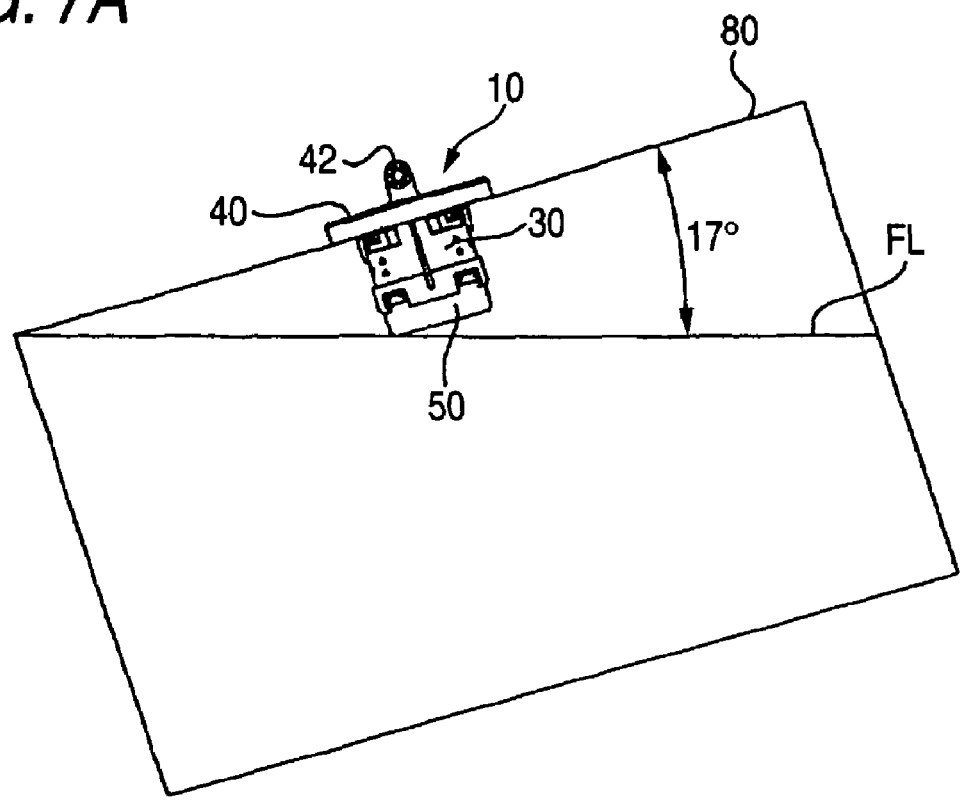

The cut valve was mounted on the upper wall of the fuel tank, and as shown in FIG. 7A, this fuel tank 80 was tiled 17° with respect to the fuel level FL. At that time, the fuel in an amount allowing a lowermost portion of the cut valve to come into contact with the fuel was filled in the fuel tank 80.

Further, the fuel tank was installed on a rotatively driving apparatus having a motor and the like. In addition, a pipe portion 82 for blowing in air was provided on the upper wall of the fuel tank 80 (see FIG. 8A).

Figure 7B:
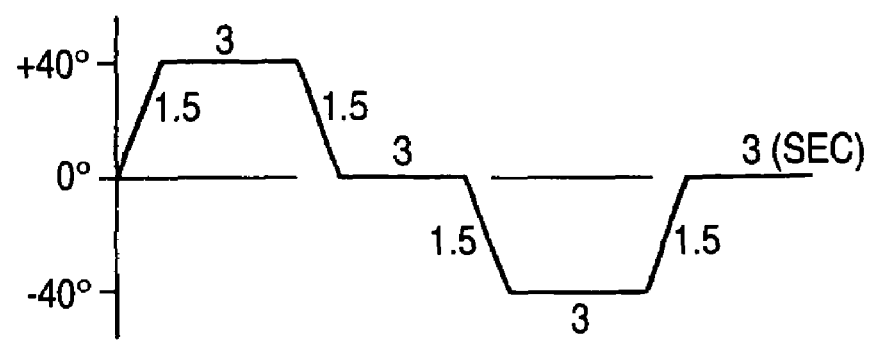
Figure 8A:
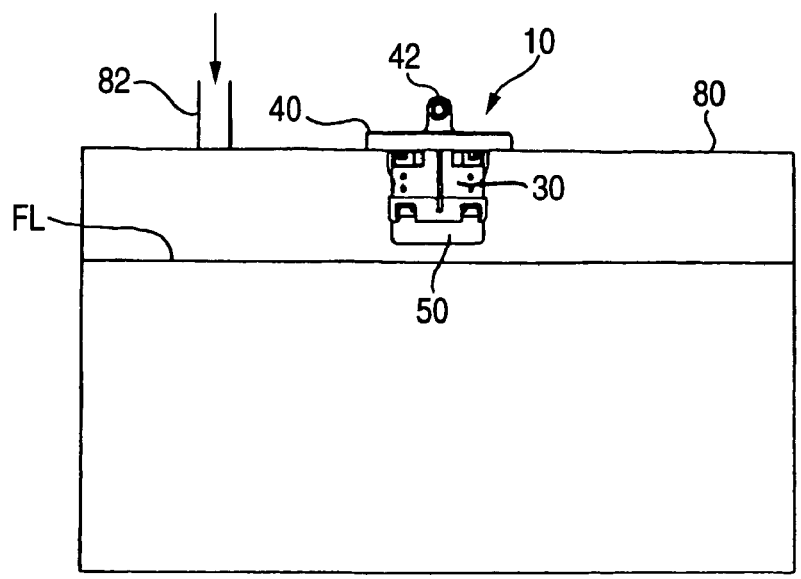

Then, as shown in FIG. 8A, the fuel tank 80 was rotated in the cycle shown in FIG. 7B while air was being blown into the fuel tank 80 with a pressure of 3 kPa.

Figure 8B:
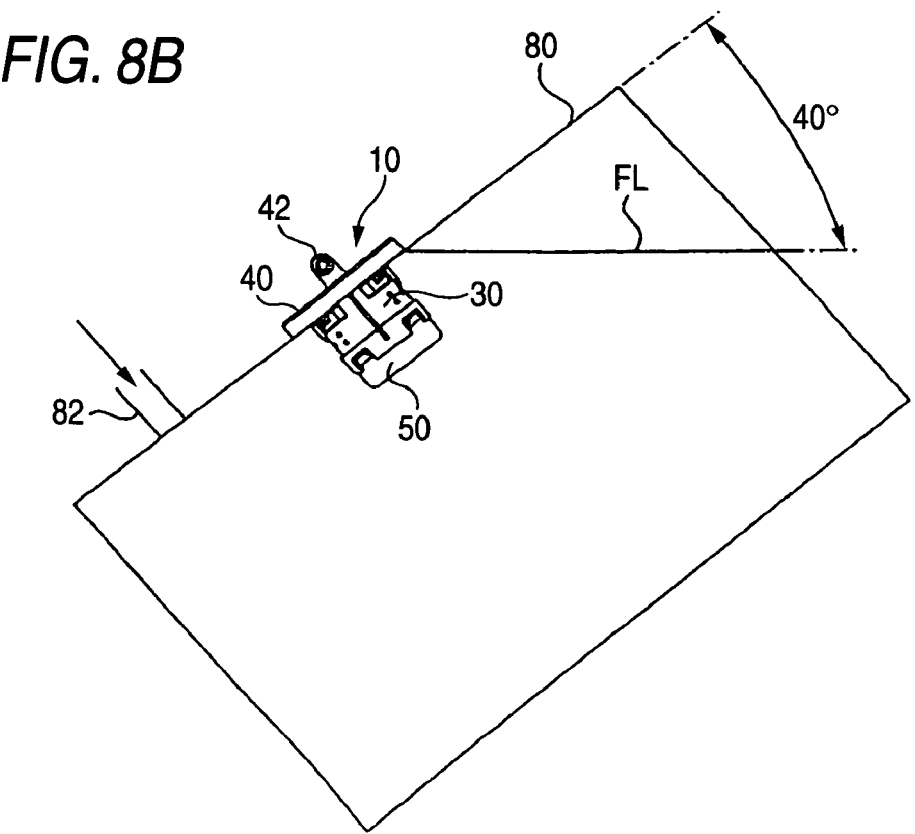

Namely, as shown in FIG. 8B, the fuel tank 80 was first rotated counterclockwise for 1 second such that the upper surface of the fuel tank 80 assumed an angle of 40° with respect to the fuel level FL. In that state, the fuel tank 80 was held for 3 seconds, and the fuel tank 80 was further rotated clockwise for 1.5 seconds such that the upper surface of the fuel tank 80 assumed a horizontal state with respect to the fuel level FL. The fuel tank 80 was then held for 3 seconds. This operation was repeated in the clockwise direction as well (see FIG. 7B). This procedure was set as one cycle, and this cycle was repeated for 20 minutes.

The above-described operation was carried out for each cut valve, and the amount of fuel leakage from the valve seat 36 at that time was measured. The results for one cycle at that time are shown in FIG. 9.

According to FIG. 9, after the float valve 60 closed the vent hole 35, the amount of leakage during lowering was 3.5 cc in the Comparative Example D and 2.9 cc in the Comparative Example E, whereas it was 1.0 cc in the Example. Thus, it can be understood that the sealability between the float valve 60 and the valve seat 36 in the Example is improved in comparison with the Comparative Examples D and E.

In addition, in the case where the above-described cycle was repeated for 20 minutes, the amount of leakage was measured to be 4.1 cc in the Comparative Example D and 3.5 cc in the Comparative Example E, whereas the amount of leakage was measured to be only 1.4 cc. Accordingly, it can be understood that the sealability between the float valve 60 and the valve seat 36 in the cut valve of the Example is improved in proportion to the elapsed time in comparison with the Comparative Examples D and E.

To sum up the above-described results of the Tests 1 to 5, according to the cut valve 10 of the invention, a resin material of a sliding grade was used for at least one of the float valve 60 and the valve seat 36 provided in the tubular body 30, and the seal portion 36b of the valve seat 36 was formed into a tapered shape in which its diameter is gradually enlarged in the direction toward the float valve 60 at an angle of 31 to 34 degrees with respect to the axis of the vent hole 35. Therefore, it was verified that by virtue of the synergistic action of these arrangements, the opening and closing operation of the vent passage between the interior of the fuel tank and the outside can be effected reliably, and that it is possible to sufficiently ensure the sealability between the float valve 60 and the valve seat 36.

The cut valve in accordance with the invention can be used as a cut valve which is installed on the fuel tank of an automobile or the like and is adapted to shut off the vent passage between the interior of the fuel tank and the outside when the fuel level in the fuel tank has risen, so as to prevent leakage to the outside.

What is claimed is:

1. A cut valve which is installed on a fuel tank and is adapted to
   shut off a vent passage between the interior of the fuel tank and the outside when a fuel level in the fuel tank has risen, comprising:
   a housing including:
      a cover having a lead-out pipe connectable to an external pipe;
      a tubular body provided with a ceiling portion connected to a lower side of the cover and having a vent hole communicating with the lead-out pipe; and
      a bottom portion closing a lower surface of the tubular body; and
   a float valve which is slidably accommodated in the housing and is adapted to open or close the vent hole by coming into contact with and moving away from a valve seat provided at a peripheral edge of the vent hole in the ceiling portion, said float valve comprising ribs formed along an axial direction on an outer periphery of the float valve and projecting upwardly of an upper surface of the float valve, said ribs comprising projecting portions,
   wherein the ceiling portion of the tubular body is formed to have:
      the valve seat that defines the vent hole;
      a protruding portion that is formed radially outward from the valve seat to protrude toward the float valve; and
      a recessed portion that is formed of radially outward from the protruding portion, said projecting portions being configured to insert into said recessed portion,
   wherein a radial width of the protruding portion is wider than that of the recessed portion,
   wherein a size of said projecting portions in an upward direction from the upper surface of the float valve is larger than an interval between the upper surface of the float valve and the protruding portion of the tubular body in a state in which the float valve has floated up to close the vent hole,
   wherein both of the upper surface of the float valve and a lower surface of the protruding portion are formed in a substantially planar-shape, and
   wherein, in a state where the float valve has floated up to close the vent hole, the upper surface of the float valve and the lower surface of the protruding portion are substantially in parallel with each other, and
   further comprising an annular rib extending upright from said ceiling portion of said tubular body, said annular rib surrounding said valve seat.

2. The cut valve according to claim 1, wherein the resin material of a sliding grade is one in which a lubricant selected from silicone-, paraffin-, fatty acid ester-, and molybdenum dioxide-based lubricants is added to a resin selected from polybutylene terephthalate (PBT), polyphenylene sulfide (PPS), polyamide (PA), polyoxymethylene (POM), and polycarbonate (PC).

3. The cut valve according to claim 1, wherein the interval between the upper surface of the float valve and the protruding portion of the tubular body in the state in which the float valve has floated up and closed the vent hole is 2 to 3 mm.

4. The cut valve according to claim 1, wherein said cover comprises a substantially cylindrical plate having an annular rib extending downward from a peripheral edge of said substantially cylindrical plate.

5. The cut valve according to claim 1, wherein said tubular body further comprises a cylindrical peripheral wall which is integrally formed with said ceiling portion.

6. The cut valve according to claim 1, wherein said ceiling portion comprises a flange portion formed on a peripheral edge of said ceiling portion.

7. The cut valve according to claim 1, wherein said ceiling portion further comprises a plurality of ribs provided upright from said ceiling portion.

8. The cut valve according to claim 7, wherein said ceiling portion further comprises a plurality of insertion holes disposed between said plurality of ribs.

9. The cut valve according to claim 7, wherein said cover comprises a plurality of engaging pieces, which engage said plurality of insertion holes.

10. The cut valve according to claim 9, wherein said tubular body further comprises a plurality of pawl portions, which engage said engaging pieces.

11. The cut valve according to claim 5, wherein said tubular body comprises a plurality of through holes formed in said cylindrical peripheral wall.

12. A fuel tank, comprising:
a cut valve, which is adapted to shut off a vent passage between the interior of the fuel tank and the outside when a fuel level in the fuel tank has risen, said cut valve comprising:
a housing comprising:
a cover having a lead-out pipe connectable to an external pipe;
a tubular body provided with a ceiling portion connected to a lower side of the cover and having a vent hole communicating with the lead-out pipe; and
a bottom portion closing a lower surface of the tubular body; and
a float valve which is slidably accommodated in the housing and is adapted to open or close the vent hole by coming into contact with and moving away from a valve seat provided at a peripheral edge of the vent hole in the ceiling portion, said float valve comprising ribs formed along an axial direction on an outer periphery of the float valve and projecting upwardly of an upper surface of the float valve, said ribs comprising projecting portions,
wherein the ceiling portion of the tubular body is formed to have:
the valve seat that defines the vent hole;
a protruding portion that is formed radially outward from the valve seat to protrude toward the float valve; and
a recessed portion formed radially outward from the protruding portion said projecting portions being configured to insert into said recessed portion, and
wherein a radial width of the protruding portion is wider than that of the recessed portion,
wherein a size of said projecting portions in an upward direction from the upper surface of the float valve is larger than an interval between the upper surface of the float valve and the protruding portion of the tubular body in a state in which the float valve has floated up to close the vent hole,
wherein both of the upper surface of the float valve and a lower surface of the protruding portion are formed in a substantially planar-shape, and
wherein, in a state where the float valve has floated up to close the vent hole, the upper surface of the float valve and the lower surface of the protruding portion are substantially in parallel with each other, further comprising an annular rib extending upright from said ceiling portion of said tubular body, said annular rib surrounding said valve seat.

13. The fuel tank according to claim 12, wherein the resin material of a sliding grade is one in which a lubricant selected from silicone-, paraffin-, fatty acid ester- and molybdenum dioxide-based lubricants is added to a resin selected from polybutylene terephthalate (PBT), polyphenylene sulfide (PPS), polyamide (PA), polyoxymethylene (POM), and polycarbonate (PC).

14. The fuel tank according to claim 12, wherein the interval between the upper surface of the float valve and the protruding portion of the tubular body in the state in which the float valve has floated up and closed the vent hole is 2 to 3 mm.

15. A cut valve, comprising:
a housing comprising:
a cover having a lead-out pipe connectable to an external pipe; and
a tubular body provided with a ceiling portion connected to a lower side of the cover and having a vent hole communicating with the lead-out pipe and a valve seat provided at a peripheral edge of said vent hole; and
a float valve, which is slidably accommodated in the housing, said float valve comprising ribs formed along an axial direction on an outer periphery of the float valve and projecting upwardly of an upper surface of the float valve, said ribs comprising projecting portions,
wherein the ceiling portion of the tubular body is formed to have:
the valve seat that defines the vent hole;
a protruding portion that is formed radially outward from the valve seat to protrude toward the float valve; and
a recessed portion formed around of radially outward from the protruding portion said projecting portions being configured to insert into said recessed portion,
wherein a radial width of the protruding portion is wider than that of the recessed portion,
wherein a size of said projecting portions in an upward direction from the upper surface of the float valve is larger than an interval between the upper surface of the float valve and the protruding portion of the tubular body in a state in which the float valve has floated up to close the vent hole,
wherein both of the upper surface of the float valve and a lower surface of the protruding portion are formed in a substantially planar-shape, and
wherein, in a state where the float valve has floated up to close the vent hole, the upper surface of the float valve and the lower surface of the protruding portion are substantially in parallel with each other, further comprising an annular rib extending upright from said ceiling portion of said tubular body, said annular rib surrounding said valve seat.

16. The cut valve according to claim 15, wherein the interval between the upper surface of the float valve and the protruding portion of the tubular body in the state in which the float valve has floated up and closed the vent hole is 2 to 3 mm.

17. The cut valve according to claim 1, wherein an inner periphery of the valve seat has a tapered shape in which its diameter is gradually enlarged in a direction toward the float valve at an angle of 31 degrees to 34 degrees with respect to a central axis of the vent hole.

18. The fuel tank according to claim 12, wherein an inner periphery of the valve seat has a tapered shape in which its diameter is gradually enlarged in a direction toward the float valve at an angle of 31 degrees to 34 degrees with respect to a central axis of the vent hole.

19. The cut valve according to claim 15, wherein an inner periphery of the valve seat has a tapered shape in which its diameter is gradually enlarged in a direction toward the float valve at an angle of 31 degrees to 34 degrees with respect to a central axis of the vent hole.

20. The cut valve according to claim 1, wherein the valve seat and the protruding portion are separately formed to define a gap therebetween.

* * * * *